(12) United States Patent
Huang (10) Patent No.: US 7,519,619 B2
(45) Date of Patent: Apr. 14, 2009

(54) FACILITATING DOCUMENT CLASSIFICATION USING BRANCH ASSOCIATIONS

(75) Inventor: Jong S. Huang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 250 days.

(21) Appl. No.: 11/465,975

(22) Filed: Aug. 21, 2006

(65) Prior Publication Data

US 2008/0046486 A1  Feb. 21, 2008

(51) Int. Cl.
*G06F 7/00* (2006.01)
(52) U.S. Cl. ............... 707/104.1; 707/8; 707/3; 707/200
(58) Field of Classification Search ............... 707/205, 707/104.1, 8, 3; 715/513
See application file for complete search history.

(56) References Cited

U.S. PATENT DOCUMENTS

| | | | |
|---|---|---|---|
| 5,463,773 A | 10/1995 | Sakakibara et al. | |
| 5,943,669 A | 8/1999 | Numata | |
| 6,233,575 B1 | 5/2001 | Agrawal et al. | |
| 6,240,410 B1 | 5/2001 | Wical | |
| 6,502,081 B1 | 12/2002 | Wiltshire, Jr. et al. | |
| 6,665,681 B1 | 12/2003 | Vogel | |
| 6,678,692 B1 | 1/2004 | Hyatt | |
| 2002/0078044 A1 | 6/2002 | Song et al. | |
| 2003/0050786 A1* | 3/2003 | Jax et al. | 704/500 |
| 2004/0117367 A1 | 6/2004 | Smith et al. | |
| 2005/0022114 A1* | 1/2005 | Shanahan et al. | 715/513 |
| 2005/0114763 A1 | 5/2005 | Nonomura et al. | |
| 2005/0226511 A1 | 10/2005 | Short | |
| 2006/0218126 A1* | 9/2006 | De Ruijter et al. | 707/3 |
| 2006/0259681 A1* | 11/2006 | Rudelic et al. | 711/103 |

OTHER PUBLICATIONS synonym.com defines "count" as "number".*
Lee Yong-Bae, Myaeng Sung Hyon, Automatic Identification of Text Genres and Their Roles in Subject-Based Categorization, 2004, IEEE.*
Lertnattee Verayuth, Theeramunkong Thanaruk, Improving Thai Academic Web Page Clasification Using Inverse Class Frequency and Web Link Information, 2008, Google.*
Poblete Barbara, Baeza-Yates Ricardo, Query-Sets: Using Implicit Feedback and Query Patterns to Organize Web Documents, Apr. 21-25, 2008.*
Stefan Ruger, "Putting the user in the loop: visual resource discovery," Department of Computing, South Kensington Campus, Imperial College, London SW7 2AZ, United Kingdom, website http://mmir.doc.ic.ac.uk/www-pub/amr-2005.pdf.

(Continued)

*Primary Examiner*—Mohammad Ali
*Assistant Examiner*—Donald Lawson
(74) *Attorney, Agent, or Firm*—Shook, Hardy & Bacon LLP (57) ABSTRACT

Systems and methods for classifying documents into categories based on text associated with the documents are disclosed. Embodiments of the present invention further provide methods for establishing a database of hierarchical classes and a system for classifying text-related content into the hierarchical classes. Text relating to documents is parsed into features with at least one feature having a plurality of terms. Vocabulary is determined from the features based on feature frequency and for each class into which a document is classified, the vocabulary that occurs in the text associated with the document is stored.

20 Claims, 7 Drawing Sheets

OTHER PUBLICATIONS

Hsinchun Chen, Bruce Schatz, Tobun Ng, Joanne Martinez, Amy Kirchhoff and Chienting Lin, "A Parallel Computing Approach to Creating Engineering Concept Spaces for Semantic Retrieval: The Illinois Digital Library Initiative Project," website http://ieeexplore.ieee.org/iel5/7953/21974/01021262.pdf?isNumber=.

Mingyu Lu, Qiang Zhou, Fan Li, Yuchang Lu and Lizhu Zhou, "Recommendation of Web Pages Based on Concept Association," Department of Computer Science and Technology, Tsinghua University, Beijing, 100084, Department of Computer Science and Engineering, Yantai University, Shandong, 264005, website http://ieeexplore.ieee.org/iel5/7953/21974/01021262.pdf?isNumber=.

* cited by examiner

STOP WORDS

CLASS VOCABULARY

CLASS NOISE

FACILITATING DOCUMENT CLASSIFICATION USING BRANCH ASSOCIATIONS

BACKGROUND

Various forms of media, such as articles, videos, and images, will each typically have some form of text associated therewith, either in the body of the document or elsewhere, that provides information as to the content of the media. Often times this media is stored and retrieved according to the associated text. Media can be more efficiently stored and retrieved when it is classified by a particular subject so as to reduce the time necessary to file and retrieve it. Prior storage systems have typically classified media into mutually exclusive categories such as news, sports, entertainment, etc. This is also commonly referred to as flat partitioning.

In order to classify media into these mutually exclusive categories or partitions, key vocabulary consisting of one or more terms from the text is captured and extracted. These terms are typically stemmed, in which the ending of a term is removed and only the root is maintained. Furthermore, when capturing key vocabulary, terms are often taken individually, not in a group or phrase. As a result, key vocabulary can lose its primary meaning. Based on these individual, stemmed terms, the media to which they are associated is classified into one of a plurality of flat partitions. However, improper or poor classification of media can occur depending on how vocabulary is extracted and if key vocabulary have lost their primary meaning due to stemming and other filtering.

SUMMARY

Embodiments of the present invention provide systems and methods for facilitating document classification. More specifically, embodiments of the present invention provide systems and methods for training a document classification system utilizing pre-classified documents and for classifying unclassified documents. During the training of the document classification system, vocabularies for each class in a pre-defined hierarchical classification system are defined. Once vocabularies are defined, they are compared with features of unclassified documents to determine one or more classes in which the document should be classified.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Embodiments of the present invention provide systems and methods for facilitating document classification. More specifically, embodiments of the present invention provide systems and methods for training a document classification system utilizing pre-classified documents and for classifying unclassified documents. During training of the document classification system, vocabularies for each class in a pre-defined hierarchical classification system are defined. Once vocabularies are defined, they are compared with features of unclassified documents to determine one or more classes in which the document should be properly classified.

Accordingly, one embodiment of the present invention is directed to one or more computer-readable media having computer-executable instructions embodied thereon for performing a method for facilitating document classification. The method includes receiving a plurality of documents classified into one or more pre-defined classes, each of the documents having text associated therewith. The method further includes parsing the text associated with each document into one or more features, wherein at least one of the features in each document includes a plurality of terms. Features are then compared amongst each other to identify those features that occur at least a threshold number of times in the plurality of documents being parsed. The features that meet or exceed the threshold are classified as vocabularies. For each class into which a document is classified, the vocabularies that occur in the text associated with the document and the number of times each vocabulary occurs in any of the documents classified in the class are stored in association therewith.

In another embodiment, the present invention is directed to a method for classifying documents in at least one of a plurality of pre-defined classes, each class having a plurality of documents associated therewith. The method includes receiving a document having text associated therewith and parsing the text associated with the document into one or more features, one or more of the features includes a plurality of terms. The parsed features are compared to a predefined list of stop features and any features parsed from the text associated with the document that match a stop feature are removed from consideration. The resulting filtered feature list is compared to a list of vocabularies associated with each of the plurality of classes. Where matches are made between these lists, the feature is identified as a prediction vocabulary and the probability that a document with the prediction vocabulary is properly associated with each class is determined. Based on these probabilities, the document is classified in at least one class.

Further embodiments of the present invention are directed to computer readable media having computer-executable instructions for performing the methods herein disclosed.

In yet another embodiment, a system for facilitating document classification is provided comprising a training component, a classifying component, and one or more databases. The training component is configured to parse a plurality of documents into features, at least one of the features including a plurality of terms derived from text associated with at least one of the plurality of documents. Each of the plurality of documents is classified in at least on pre-defined class. The classifying component is configured to classify at least one document into one or more pre-defined classes based upon comparison of at least one feature contained therein to the features associated with the plurality of documents in the training component. The one or more databases are configured for storing data associated with the training component and classifying component.

Having briefly described an overview of embodiments of the present invention, an exemplary operating environment is described below.

Figure 1:
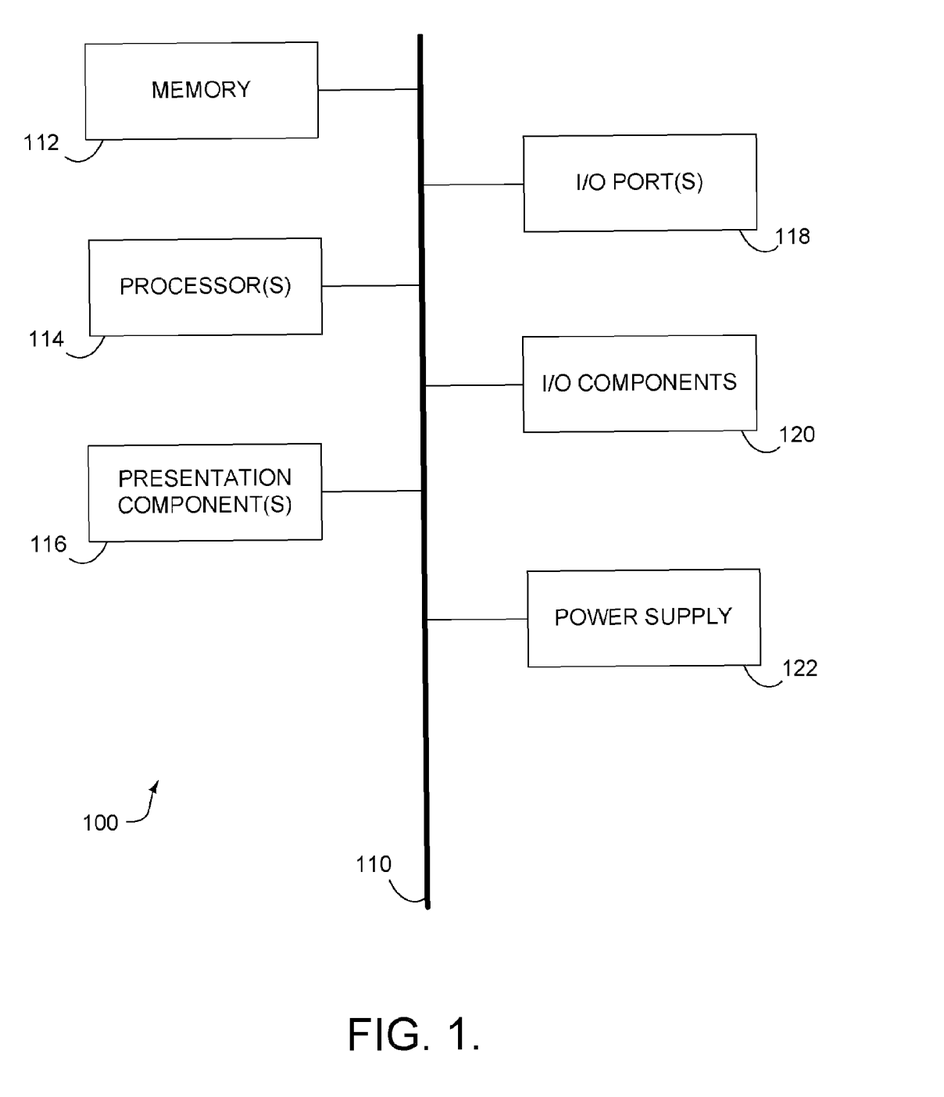
FIG. 1 is a block diagram of an exemplary computing environment suitable for use in implementing embodiments of the present invention.

Referring to the drawings in general and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks, or implement particular abstract data types. The invention may be practiced in a variety of system configurations, including hand-held devices, consumer electronics, general-purpose computers, specialty computing devices (e.g., cameras and printers), or the like. The invention may also be practiced in distributed computing environments where tasks are performed by remote processing devices that are linked through a communications network.

Computing device 100 includes a bus 110 that directly or indirectly couples the following elements: memory 112, a central processing unit (CPU) 114, one or more presentation components 116, input/output (I/O) ports 118, I/O components 120, an illustrative power supply 122 and a graphics processing unit (GPU) 124. Bus 110 represents what may be one or more busses (such as an address bus, data bus, or any combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, CPUs and GPUs have memory. The diagram of FIG. 1 is merely illustrative of an exemplary computing device that can be used in connection with one or more embodiments of the present invention. To the extent distinction is not made between such categories as "workstation," "server," "laptop," "hand-held device," etc., all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave, or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
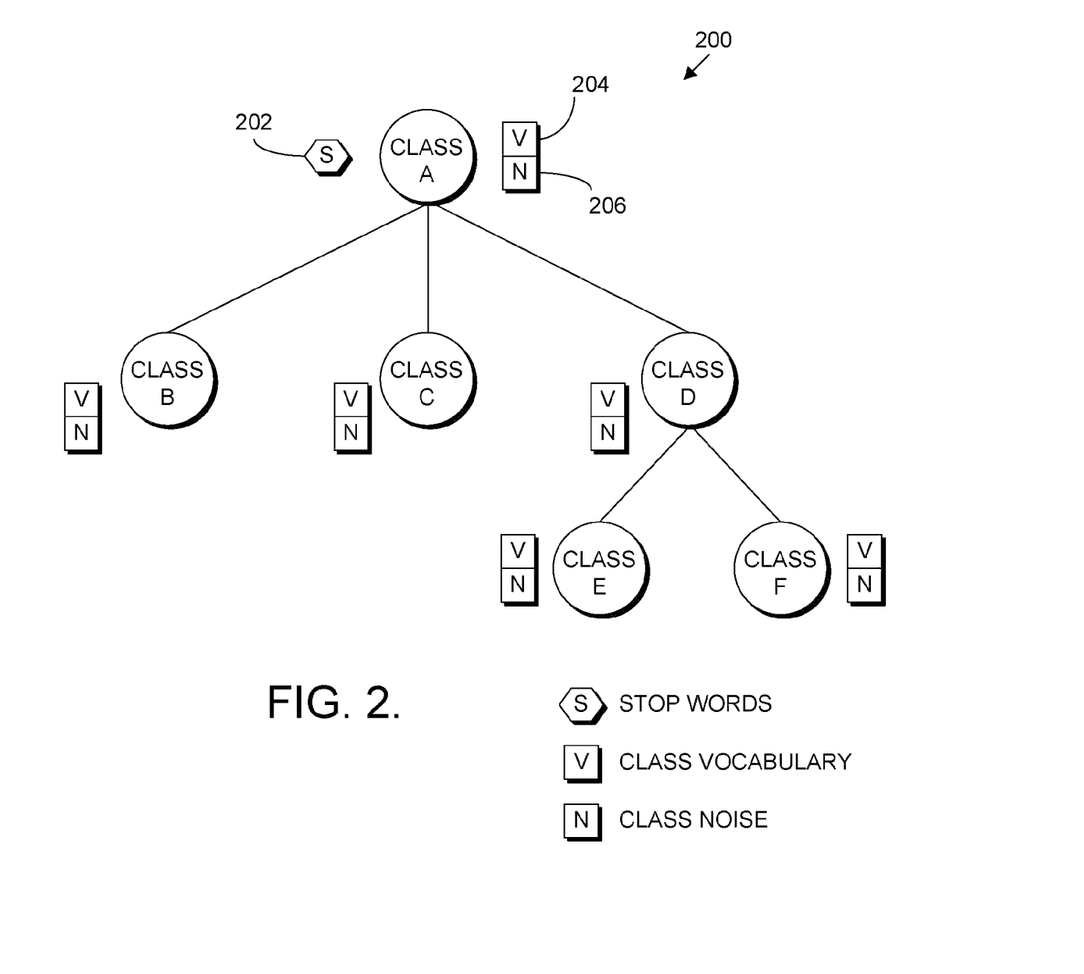
FIG. 2 is a schematic diagram illustrating a hierarchical classification scheme and information stored association therewith, in accordance with an embodiment of the present invention.

Turning to FIG. 2, a schematic diagram is shown illustrating a classification scheme 200 and the information stored in association therewith in accordance with an embodiment of the invention. In the illustrated embodiment, the classification scheme 200 is oriented in a hierarchical arrangement with root class A having three parent or first level classes B, C, and D, with class D, having two child or second level classes E and F. Stored in association with root class A is a list of stop features 202, that is, features that provide insignificant meaning to documents classified therein. Examples of single-term features that may occur on the stop features list include, but are not limited to, "the", "it", and "a." The stop features list stored in association with the root class (class A) may also be utilized for filtering features parsed from documents classified in any classes lower in the hierarchy, as more fully explained below.

Stored in association with each class is a class vocabulary list 204 and a class noise list 206. The class vocabulary list 204 is a list of features that serve to distinguish documents classified in one class from documents classified other classes. Class vocabulary are unique to a particular class with respect to any other classes at an equivalent level of the hierarchy, yet are also included in the vocabulary of any lower level classes to which the class is associated by a branch connection. For example, a vocabulary unique to class E (a second level class) is also a vocabulary for parent class D (a first level class having a branch connection to class E) and root class A (which has a branch connection to first level class D), but may or may not be a vocabulary for sibling class F (a class at an equivalent level with class E in the hierarchy). Furthermore, the vocabularies for second level class F are also vocabularies for classes D and A.

Features that are meaningful, but do not distinguish between classes at an equivalent level of the hierarchy may be classified as noise features. For example, when distinguishing a document having textual content related to baseball from other documents having sports-related textual content, vocabularies may be terms such as "home run", "base hit", and "runs batted in", whereas noise features for this class (and at least one other class at an equivalent level of the hierarchy) may include "team", "ball", and "game" as these features are not specific to only documents classified in a baseball class and could apply to documents classified in other sports-related classes as well.

Figure 3A:
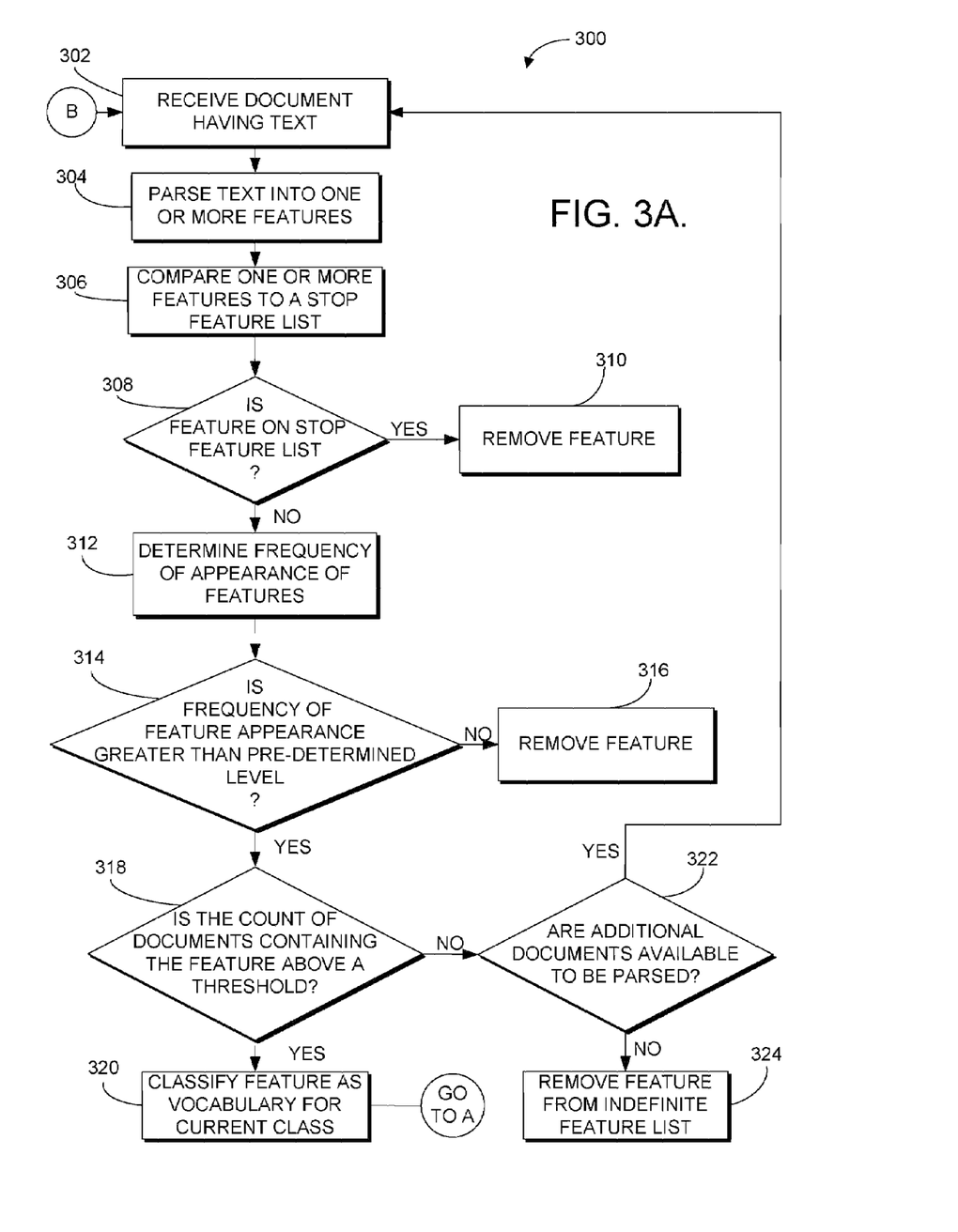
FIGS. 3A and 3B are flow diagrams illustrating a method of training a document classification system, in accordance with an embodiment of the present invention.
Figure 3B:
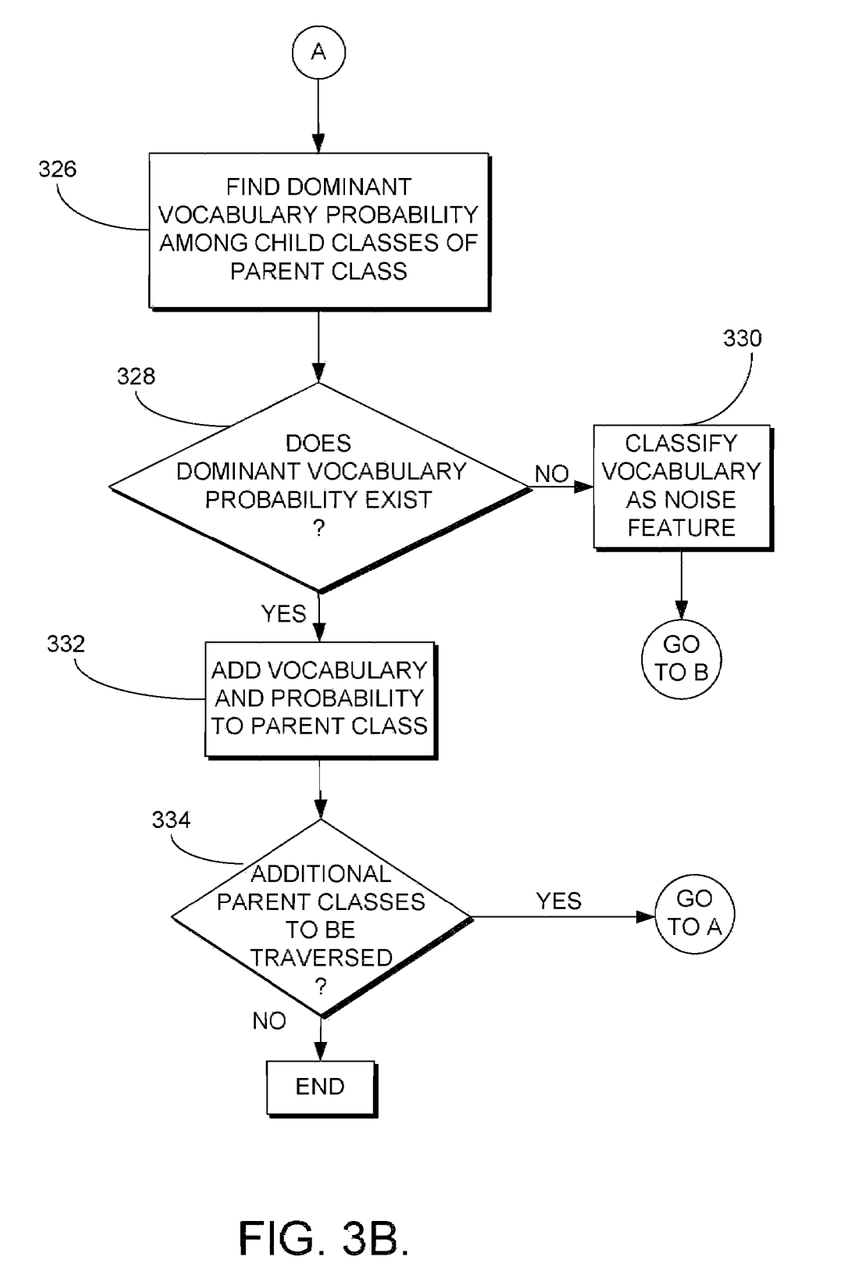

Referring now to FIGS. 3A and 3B, a flow diagram is shown illustrating a method 300 for training a document classification system, in accordance with an embodiment of the present invention. Initially, as indicated at 302, a document is received, the document including text associated therewith. As the document is to be utilized to train a document classification system, the received document is pre-classified into one or more pre-defined classes. In one embodiment, each of the pre-defined classes is part of a hierarchical structure having a single root class and a plurality of higher level classes, e.g., first level (or parent) classes and second level (or child) classes (see FIG. 2).

Next, the text associated with the received document is parsed into one or more features, as indicated at 304. "Features", as the term is utilized herein, refers to single terms and/or phrases having a configurable maximum number of adjacent terms. For instance, if the maximum number of terms in a phrase is configured to be four, features may include each of the individual terms occurring in the text associated with a document, as well as any consecutive two, three, and four term phrases. To parse the text associated with each document into features, a parser may read the text and break it into terms, each term being separated by the spaces there between. Thus, each of the individual terms may be gathered as well as the two, three, and four consecutive term phrases occurring in the text. As the features associated with a document are directly derived from the document itself, none of the features is derived from a pre-defined list.

Stored in association with each feature is a stem of the feature, an actual usage of the feature, and any states (e.g., upper case, lower case, mixed case, plurality, possessive, and abbreviation) associated with the feature, such that the features are in a human-readable form. If features with the same stem are found during the course of parsing the document, the states of the feature will be merged, with the singular and non-possessive form of the features taking precedence. For example, suppose the parser comes across the feature "John's". The stem of the feature is "john". If this is the first occurrence of the stem that has been found in the course of parsing the document, the stem, its actual usage (John's) and states (mixed case, possessive) will be recorded. Next suppose that the parser comes across the feature "John", the stem of which is also "john". As this is the second occurrence of the stem, the states of the feature will be merged with the singular, non-possessive form taking precedence. Thus, the feature will subsequently be recorded as usage "John", mixed case, non-possessive, and with a count of two occurrences.

Subsequently, each of the gathered features is compared to a list of stop features, as indicated at 306, and it is determined whether or not each feature also occurs on the stop features list, as indicated at 308. In an embodiment wherein the classes into which the pre-classified documents are classified form a hierarchical structure with a single root class, the stop feature list utilized may be the same list for each document, the list being stored in association with the root class (see FIG. 2). Any features occurring on the stop features list are removed from consideration, as indicated at 310. In one embodiment, a feature is removed from consideration only if the term that occurs in the stop feature list is the only term in the feature or is the first term or the last term of a feature phrase (multi-term feature).

If it is determined at 308 that a feature is not on the stop features list, the feature is placed on a preliminary indefinite features list and a frequency of occurrence is determined, as indicated at 312. As features that do not occur with some level of regularity are unlikely to be useful in distinguishing documents classified in one class from documents classified in another class, it may be desirable to remove features having a low frequency of occurrence. Thus, the frequency of occurrence for each feature in the document may be compared to a configurable frequency threshold and a determination may be made whether the frequency associated with each feature meets or exceeds the threshold. This is indicated at 314. If the frequency of occurrence of a feature in the document does not meet or exceed the threshold, the feature may be removed from the preliminary indefinite features list, as indicated at 316, to create an indefinite features list associated with the class(es) into which the document is classified.

If it is determined at 314 that the frequency of occurrence of a feature in the document meets or exceeds the threshold, the feature is subsequently compared to the features on the indefinite features lists associated with any other documents that have been parsed and that are classified in the same class as the document in question to determine if the count of documents containing the feature meets or exceeds a configurable threshold. This is indicated at 318. If the count of documents containing the feature meets or exceeds the threshold, the feature is classified as a vocabulary for the class into which the document in question is classified, as indicated at 320. If, however, it is determined that the count of documents containing the feature does not meet or exceed the threshold, it is subsequently determined whether there are additional documents classified in the class that are yet to be parsed, as indicated at 322. If it is determined that there are additional documents in the class that are yet to be parsed, the method returns to the step indicated at 302 and is repeated for each additional document pre-classified in the class. If it is determined that there are not additional documents in the class that are yet to be parsed, the feature is removed from the indefinite features list, as indicated at 324.

Once a feature is classified as a vocabulary for a child class and added to its class vocabulary list, it is determined whether or not the vocabulary is a useful vocabulary for distinguishing documents classified at its parent levels in the hierarchy. This is a bottom up process that starts from the child class into which a vocabulary is identified and propagates to all its parent classes wherein it is determined if the same vocabulary can be useful for distinguishing among parent classes. With reference to FIG. 3B, the vocabulary and its probability of occurrence (represented by a percentage number) are compared with the vocabularies and respective probabilities of occurrence of all other classes at an equivalent level of the hierarchy (the sum of all probabilities of occurrence for a given vocabulary at an equivalent level should be 1), as indicated at 326. At 328 it is determined whether or not there is a dominant probability of occurrence. For example, if the dominant probability is configured to be 60% then a vocabulary will be considered a useful vocabulary for a parent class only if this vocabulary has a probability of occurrence greater than 60% in one of its child classes.

If it is determined that there is no class that satisfies the dominant probability threshold at an equivalent level of the hierarchy, the feature may be classified as a noise feature, as indicated at 330, and placed on the class noise list associated with the parent class at that level of the hierarchy (e.g., 206 of FIG. 2). All features placed on the class noise list associated with a particular class are removed from the class vocabulary for that class. The process then continues at the step indicated at 302.

If, however, it is determined at 328 that there is a class with its probability of occurrence exceeding the dominant probability threshold among classes at an equivalent level of the hierarchy, the vocabulary will be added to the vocabulary list of the parent class as indicated at 332. Subsequently, as indicated at 334, it is determined whether there are any additional parent classes that are yet to be traversed. If it is determined that there are additional parent classes that are yet to be traversed, the method returns to the step 326 and is repeated for each additional parent class. If it is determined that there are not additional parent classes that are yet to be traversed, the method terminates.

In addition to being generated according to the previously identified method, vocabularies may also be manually defined by a user and associated with one or more classes, as desired. If a user desires to ensure that a particular vocabulary is associated with a particular document or class, the user can bypass the previously identified process and define his/her preferred vocabulary. This process is typically used to supplement system-defined vocabularies generated as described hereinabove. This process is also used when there is no training documents available for any given class.

Figure 4:
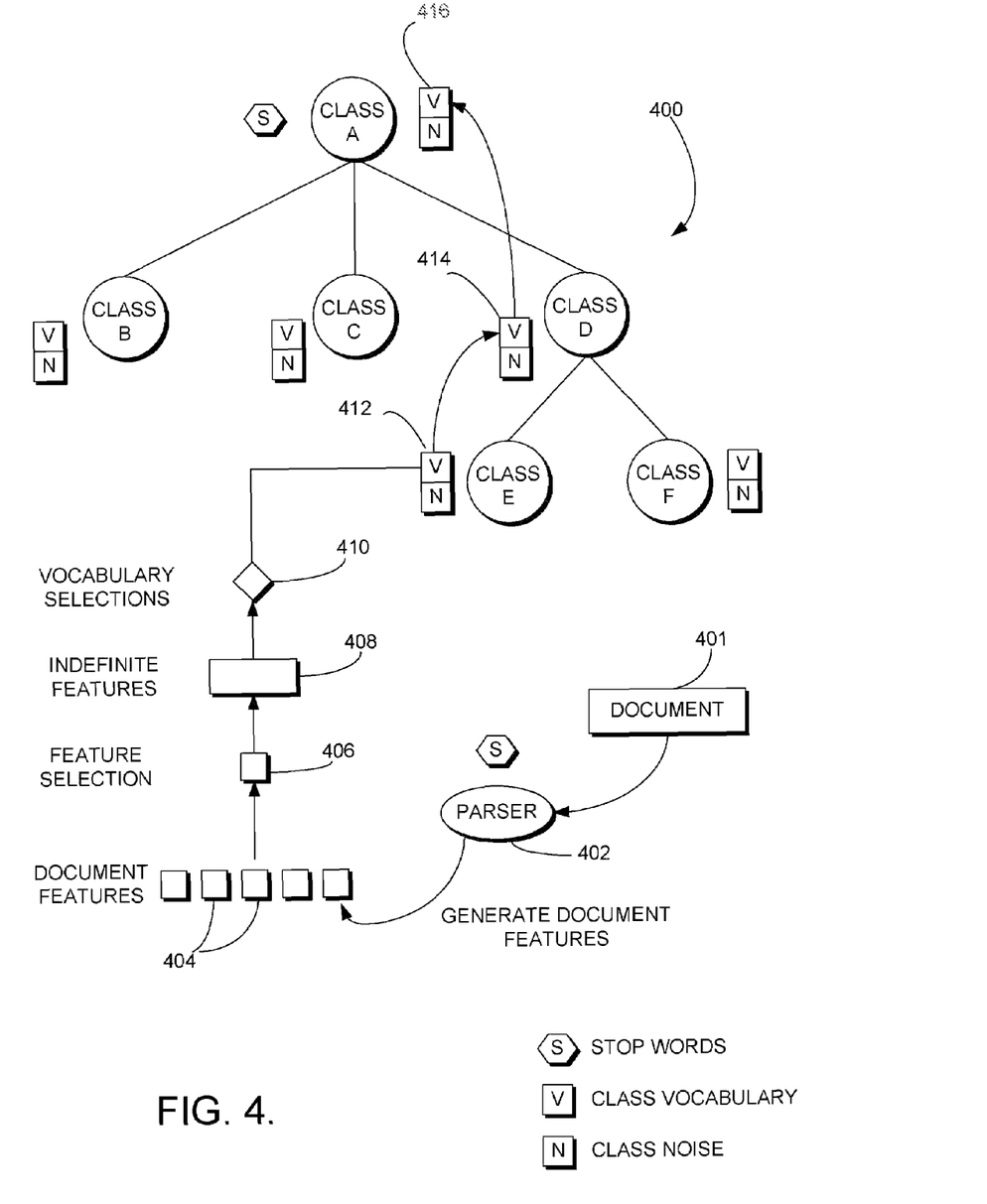
FIG. 4 is a schematic diagram illustrating a method of training a document classification system, in accordance with an embodiment of the present invention.

Referring now to FIG. 4, a schematic diagram illustrating a method of training a document classification system is shown and designated generally as reference numeral 400. It should be noted that the schematic diagram 400 illustrates the same method as that shown in FIGS. 3A and 3B but in a different view for clarity. A hierarchical structure equivalent to that illustrated in FIG. 2 is shown including root class A, parent or first level classes B, C, and D, and child or second level classes E and F. Also shown are the classes' respective class vocabulary lists and class noise lists and a stop features list associated with root class A. In association with the hierarchical structure are blocks illustrating the method of training a document class system as it pertains to a single pre-classified document.

Initially, the document 401 is received and forwarded to a parser 402 which parses the document into document features 404. The document features with frequencies exceeding a certain feature frequency threshold 406 (feature occurrences within the same document) are placed on a preliminary indefinite features list 408 associated with the class(es) into which the document being parsed is classified. When the document frequency (number of documents containing the feature) of each of the features on the preliminary indefinite features list is subsequently determined to exceed a pre-defined threshold 410, the feature is promoted to be a class vocabulary 412.

Once a class vocabulary has been identified for a class, for example class E as indicated by reference numeral 412, the parent classes are examined to determine if the vocabulary is useful for the parent classes. When inspecting class D, the probability of occurrence for the vocabulary in all child classes of class D is checked to determine if it exceeds a certain probability threshold as indicated at 414. The main goal is to determine if there is a dominant probability of occurrence by the vocabulary in question. If there is a dominant probability of occurrence, the vocabulary is added to the vocabulary list, otherwise, it is added to the class noise list for class D. After class D, we then repeat the process for its parent class A 416 to determine if the vocabulary needs to be added to the vocabulary or noise list for class A.

Figure 5:
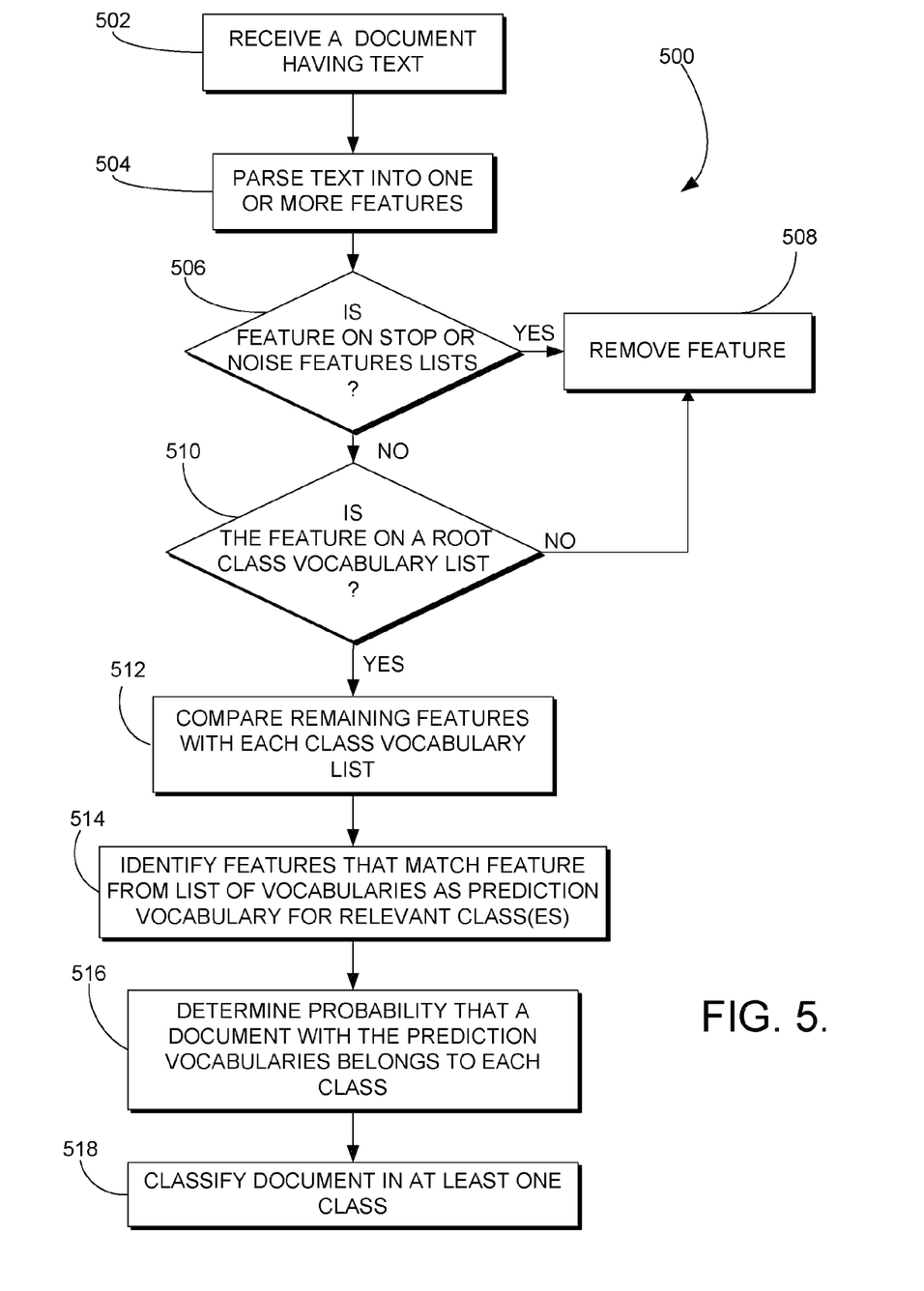
FIG. 5 is a flow diagram illustrating a method of classifying documents, in accordance with an embodiment of the present invention.

Referring now to FIG. 5, a flow diagram illustrating a method of classifying documents into one or more pre-defined classes in accordance with an embodiment of the present invention is shown and designated generally as reference numeral 500. Initially, as indicated at 501, a document is received that does not include an association with one or more classes defined according to the classification scheme of interest, the document having text associated therewith. Subsequently, the document is parsed into a plurality of single term and multiple term features (the maximum length of which was configured upon training the document classification system being utilized), as indicated at 502. In one embodiment, the parsed features include at least one multiple term feature derived from the text of the document and not from a pre-defined list of features. The features are subsequently compared to a stop features list and a noise features list, e.g., the stop features list and noise features list maintained in association with a root class of a hierarchical classification structure and it is determined whether or not the features parsed from the document also occur on these lists. This is indicated at 506. Those parsed features that do occur on either the stop features list or the noise features list are removed from consideration, as indicated at 508.

If it is determined at 506 that one or more of the features does not occur on either the stop features list or the noise features list, such features are compared to a list of vocabularies associated with the root class of the classification hierarchy (e.g., class A of FIG. 2) and it is determined whether such features match the vocabularies. This is indicated at 510. Any features that do not match a vocabulary on the root class vocabulary list are removed from consideration, as indicated at 508. Subsequently, any remaining features (i.e., those features that do match a vocabulary on the root class vocabulary list) are compared with the features of each class vocabulary list associated with a class in the first level of the hierarchy (e.g., classes B, C, and D of FIG. 2). This is indicated at 512. Next, those features that match a feature from a list of vocabularies associated with any of the first level classes are identified as prediction vocabularies, as indicated at 514.

Subsequently, a probability that a document with the relevant prediction vocabularies belongs to each class is determined, as indicated at 516. To calculate the probability that a document with the relevant prediction vocabularies belongs to a given class, e.g., class C, it should be noted that the parent node for class C maintains a probability distribution for each vocabulary as it pertains to all classes falling there under. For instance, the parent node of classes B, C, and D or FIG. 2 is root class A. As the vocabularies for each of classes B, C, and D are also vocabularies of the root class, and the frequency of occurrence in each class is also known and associated with root class A (in addition to classes B, C, and D), a probability for each vocabulary is maintained in association with root class A. Accordingly, the probability for a given vocabulary may be looked up in its parent's probability distributions.

To determine the probability that a document with the relevant prediction vocabularies belongs to any particular class, e.g., class C, the following calculation may be performed:

$X=(x_1, x_2, \ldots, x_m)$, this vector contains the vocabulary in the document that matches the vocabulary for class C.

The probability of X belongs to a class C is $$1 - \prod_{i=1}^{m} (1 - P_i),$$

where $P_i$ is the probability that a vocabulary $x_i$ belongs to a class C.

The top M classes from the classes that satisfy a pre-defined threshold probability are subsequently determined and the document is classified in each class, as indicated at 518. The threshold probability is a configurable parameter and may be, by way of example only, 80%.

Subsequently, the prediction vocabularies are compared to the list of vocabularies for each class classified in the next subsequent level of the hierarchy that is connected by a branch connection to any class into which the document is classified. For instance, if a document is classified into each of classes C and D of FIG. 2, the prediction vocabularies are next compared to the class vocabularies for classes E and F and a probability that a document with the relevant set of prediction vocabularies belongs in each of these classes is determined as set forth above. The process is then repeated through each subsequently higher class in the hierarchical structure until the threshold probability can no longer be satisfied.

Figure 6:
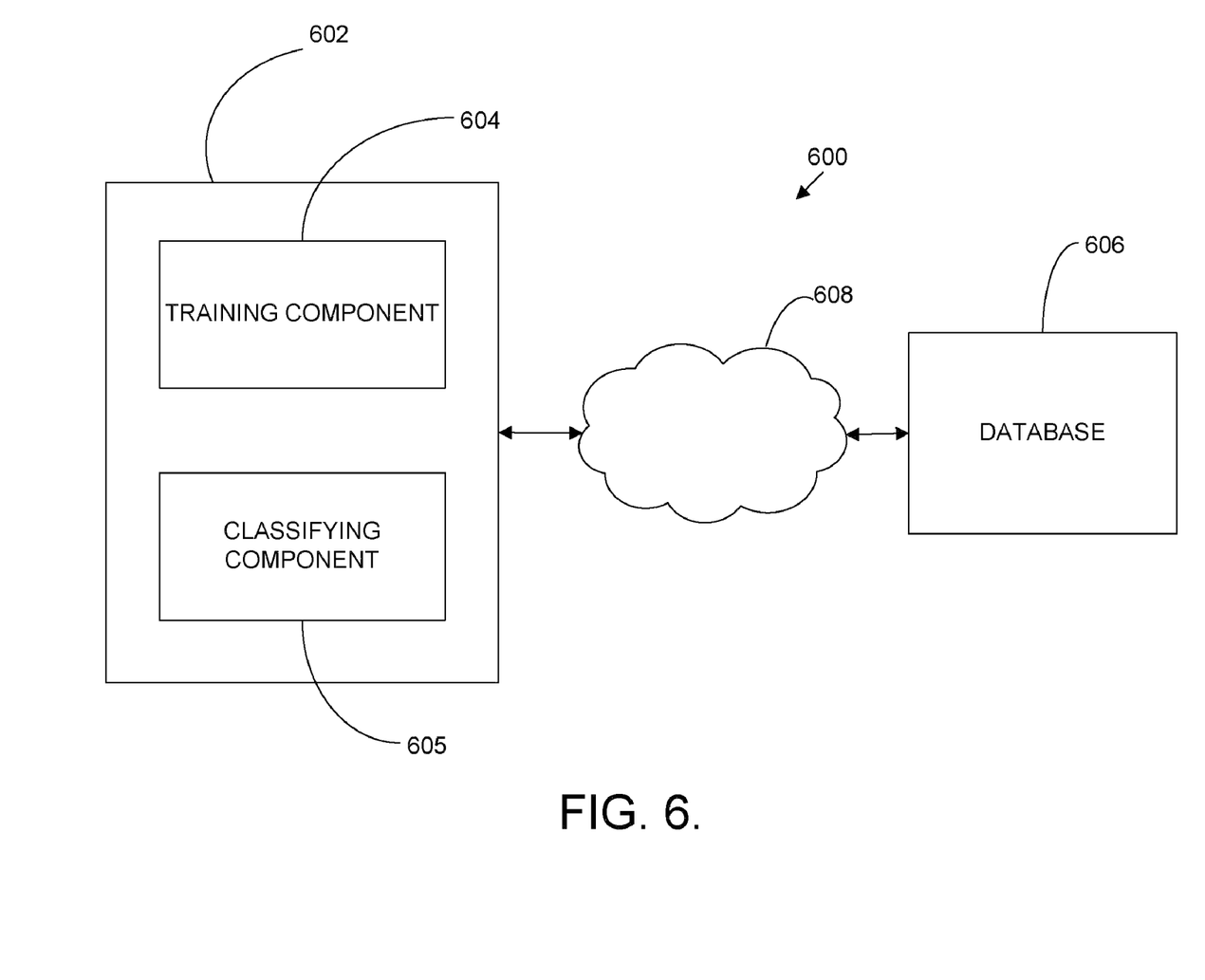
FIG. 6 is a block diagram of an exemplary system suitable for implementing embodiments of the present invention.

In addition to methods for training a document classification system and classifying a plurality of documents, embodiments of the present invention are directed towards a system for facilitating document classification, one embodiment of which is illustrated in FIG. 6 and designated generally as reference numeral 600. System 600 includes a computing device 602 and one or more databases 606 in communication with another through network 608. It will be understood and appreciated by one of ordinary skill in the art that the system 600 shown in FIG. 6 is merely an example of one suitable document classification system and is not intended to suggest any limitation as to the scope of use or functionality of embodiments of the present invention. Neither should document classification system 600 be interpreted as having any dependency or requirement related to any single component or combination of components illustrated therein.

The training component 604 may be any type of computing device, e.g., device 100 described above with reference to FIG. 1. By way of example only and not limitation, the computing device 602 may be a personal computer, desktop computer, laptop computer, handheld device, cellular phone, digital phone, PDA, or the like. It should be noted, however, that embodiments of the present invention are not limited to implementation on such computing devices, but may be implemented on any of a variety of different types of computing devices within the scope hereof Network 608 may include any computer network or combination of computer networks. Examples of computer networks configurable to operate as network 608 include, without limitation, a wireless network, landline, cable line, fiber-optic line, LAN, WAN, or the like. Network 608 is not limited, however, to connections coupling separate computer units. Rather, network 608 may also comprise subsystems that transfer data between servers or computing devices. For example, network 608 may also include a point-to-point connection, an internal system Ethernet, a backplane bus, an electrical bus, a neural network, or other internal system. In an embodiment where network 608 comprises a LAN networking environment, components are connected to the LAN through a network interface or adapter. In an embodiment where network 608 comprises a WAN networking environment, components may use a modem, or other means for establishing communications over the WAN, to communicate. Such networking environments are commonplace in offices, enterprise-wide computer networks, intranets, and the Internet. It will be understood and appreciated that the network connections shown are exemplary and other means of establishing a communications link between computing devices may also be used within embodiments of the present invention.

Though not shown for the sake of clarity, components of the computing device 602 may include, without limitation, a processing unit, internal system memory, and a suitable system bus for coupling various system components, including one or more databases for storing information (e.g., files and metadata associated therewith). The computing device 602 typically includes, or has access to, a variety of computer-readable media. By way of example, and not limitation, computer-readable media may include computer-storage media and communication media. In general, communication media enables each server to exchange data via network 608. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

The computing device 602 includes a training component 604 and a classifying component 605. The training component 604 is configured to parse a plurality of pre-classified documents into features, each document having text associated therewith. In one embodiment, at least one of the features associated with each document is a multiple term feature derived from the document text and not from a pre-defined list. Classifying component 605 is configured to classify at least one unclassified document into one or more pre-defined classes based upon comparison of at least one feature of the document to be classified with vocabularies associated with each of the pre-defined classes.

As previously described, system 600 additionally includes one or more databases 606 configured to store data associated with the computing device 602. Such data may include, without limitation, a plurality of training documents, an established classification system, one or more stop features lists, one or more noise feature lists, one or more class vocabulary lists, document counts, vocabulary and/or feature occurrences associated with documents and/or classes of documents, one or more documents to be classified, one or more prediction vocabulary lists, and one or more classification probabilities. Though database 606 is illustrated as a single database, it will be understood and appreciated by those of ordinary skill in the art that this is merely by way of illustration and not limitation. In fact, database 606 may be any single database or a plurality of databases in communication with one another through network 608. Additionally, one or more databases may be provided as a component of computing device 602. Any and all such variations are contemplated to be within the scope of embodiments hereof.

It should be noted that in addition to classifying a plurality of documents based on feature frequencies, document classification can also occur over a given time frame, as specified by a user. Furthermore, the list of classes into which the plurality of documents is classified can be maintained over a specified time frame. This option allows for a user to either extend or abbreviate the period of time over which documents are classified, such that the training and classifying components can adjust to new documents over time. By maintaining the list of classes over a given time frame, at least one topic of interest can be determined. In addition, the system and methods disclosed herein allow for on-going refinements in the document classification system such that vocabulary and noise lists are updated as new documents are received for classification.

Alternative embodiments and implementations of the present invention will become apparent to those skilled in the art to which it pertains upon review of the specification, including the drawing figures. Accordingly, the scope of the present invention is defined by the appended claims rather than the foregoing description. For example, the present invention is not limited to English applications. If documents in a language other than English are to be classified, then only the parser needs to be changed to implement a different language. Accordingly, the scope of the present invention is defined by the appended claims rather than the foregoing description.

What is claimed is:

1. One or more computer storage media having computer executable instructions embodied thereon that is executed by a processing unit for performing a method for facilitating document classification, the method comprising:
    receiving a plurality of documents, each document having text associated therewith;
    pre-classifying each of the plurality of documents into one or more pre-defined classes of a hierarchical structure, wherein the hierarchical structure arranges the one or more predefined classes into a single root class and lower level classes;
    parsing the text associated with each document into one or more features, wherein at least one of the one or more features includes a plurality of terms;
    determining a frequency of occurrence of the one or more features parsed from the text associated with each document;
    identifying those features that are associated with a determined frequency of occurrence that meets or exceeds a threshold frequency as preliminary indefinite features;
    counting documents within the plurality of documents that are associated with the features identified as preliminary indefinite features;
    ascertaining that the count of the documents meets or exceeds a document threshold; and
    storing the identified features that occur in the text associated with the documents as vocabularies associated with a predefined class of the one or more predefined classes, wherein the vocabularies are unique to each of the one or predefined classes at a same equivalence level of the lower level classes of the hierarchical structure, and wherein the identified features are stored as vocabularies of the lower level classes related by a branch connection to the predefined class associated with the stored vocabularies.

2. The computer storage media of claim 1, wherein the lower level classes comprises a plurality of parent and/or child classes associated with the single root class.

3. The computer storage media of claim 2, wherein a stop feature list is stored in association with the single root class, and wherein the method further comprises:
    comparing the one or more features parsed from the text associated with each document to the stop feature list; and
    if a feature of the one or more features occurs in the stop feature list, removing the feature.

4. The computer storage media of claim 3, further comprising:
    determining if one or more of the terms comprising the at least one of the features that includes a plurality of terms occurs in the stop feature list; and
    if it is determined that at least one of the terms occurs in the stop feature list, removing the feature only if the term that occurs in the stop feature list begins or ends the feature.

5. The computer storage media of claim 2, wherein each vocabulary stored in association with a child class is also stored in association with a parent class to which the child class is related by a branch connection.

6. The computer storage media of claim 5, wherein in association with each vocabulary stored in association with a parent class is stored a count comprising the number of times that vocabulary occurs in the text associated with any of the documents classified in the parent class.

7. The computer storage media of claim 2, wherein the method further comprises:
    determining a probability of occurrence for the vocabulary;
    determining whether or not there is a dominant probability of occurrence; and
    classifying the vocabulary into a noise class if there is no predefined class that satisfies the dominant probability threshold at within the same equivalence level of the hierarchical structure.

8. The computer storage media of claim 1, wherein none of the features is derived from a pre-defined list of features.

9. The computer storage media of claim 1, wherein the method further comprises receiving at least one vocabulary that is manually defined by a user.

10. The computer storage media of claim 1, wherein a presentation of at least one of the features includes a stem and one or more states, and wherein the presentation is maintained upon identification of the at least one of the features as a vocabulary.

11. The computer storage media of claim 10, wherein the one or more states comprise an upper case state, a mixed case state, a plural state, a possessive state, and an abbreviated state.

12. A method for classifying documents in at least one of a plurality of classes, each class having a plurality of documents associated therewith, the method being executed by a processor, the method comprising:
    receiving a document having text associated therewith;
    parsing the text associated with the document into one or more features, wherein at least one of the one or more features includes a plurality of terms;
    comparing the one or more features parsed from the text to a predefined list of stop features;
    when a feature parsed from the text associated with the document matches a feature occurring on the list of stop features, removing the matching feature from the one or more features parsed from the text associated with the document;
    otherwise submitting the feature parsed from the text associated with the document to a filtered feature list;
    comparing each feature occurring on the filtered feature list with a list of vocabularies associated with each of the plurality of classes, wherein each feature that matches a feature from any list of vocabularies is identified as a prediction vocabulary, and wherein the list of vocabularies is derived from features extracted from a set of training documents via a process comprising:

(a) assigning the set of training documents to a predefined class of the plurality of predefined classes organized within hierarchical structure having a root class and lower level classes; and (b) ascertaining that features, extracted from the set of documents, occur more frequently than a threshold frequency within more documents of the set of training documents than a document threshold;

determining a frequency of occurrence of each prediction vocabulary in the documents associated with each class; and classifying the document in at least one class of the lower level classes based on the determined occurrence frequencies, wherein the at least one class includes the root class.

13. The method of claim 12, wherein the lower level classes comprise a plurality of parent and/or child classes associated therewith, and wherein the method further comprising:

classifying the document in at least one child class of the lower level classes; and classifying the document in at least one parent class of the lower level classes that is connected by a branch connection to the at least one child class.

14. The method of claim 12, wherein none of the features is derived from a pre-defined list of features.

15. The method of claim 12, wherein at least one of the vocabularies on at least one list of vocabularies associated with at least one of the plurality of classes is manually defined by a user.

16. The method of claim 12, wherein a presentation of at least one of the features includes a stem and one or more states, and wherein the presentation is maintained upon identification of the at least one of the features as a prediction vocabulary.

17. The computer readable media of claim 12, further comprising:

determining if one or more of the terms comprising the at least one of the features that includes a plurality of terms occurs in the stop feature list; and if it is determined that at least one of the terms occurs in the stop feature list, removing the feature only if the term that occurs in the stop feature list begins or ends the feature.

18. The method of claim 12, further comprising:

classifying a plurality of documents based on determined occurrence frequencies over given time frame;

maintaining a list of classes into which the plurality of documents is classified over the given time frame; and identifying at least one topic of interest associated with the time frame based upon the maintained list.

19. A computer system for facilitating document classification, the computer system comprising a processing unit coupled to a computer storage medium, the computer storage medium having stored thereon a plurality of computer software components executable by the processing unit in communication with a database, the computer software components comprising:

a training component configured to parse a plurality of documents into features, at least one of the features including a plurality of terms derived from text associated with at least one of the plurality of documents, each of the documents being classified in at least one predefined class;

a classifying component configured to classify at least one document into one or more of the pre-defined classes, wherein classifying comprises:

(a) pre-classifying each of the plurality of documents into one or more pre-defined classes of a hierarchical structure, wherein the hierarchical structure arranges the one or more predefined classes into a parent classes and child classes;

(b) ascertaining that the at least one feature occurs more frequently than a threshold frequency within more documents of the plurality of documents than a document threshold; and the database for storing the at least one feature as a vocabulary associated with at least one predefined class of the one or more predefined classes into which the plurality of documents is pre-classified, wherein the at least one predefined class comprises a child class that is connected by a branch connection to a parent class; and wherein the at least one feature is stored as a vocabulary associated with the connected parent class.

20. The computer system of claim 19, wherein storing the at least one feature as a vocabulary associated with the connected parent class comprises:

determining a probability of occurrence of the at least one feature stored as a vocabulary associated with the at least one predefined class;

comparing the probability of occurrence against probabilities of occurrence determined for each of the one or more predefined classes that exist on an equivalent level of the hierarchical structure as the at least one predefined class; and storing the at least one feature as a vocabulary associated with the parent class connected to the at least one predefined class upon ascertaining that the probability of occurrence associated with the at least one predefined class is greater than any of the probabilities of occurrence determined for each of the one or more predefined classes that exist on the equivalent level of the hierarchical structure.

* * * * *